United States Patent [19]

Genuit

[11] Patent Number: 4,882,646
[45] Date of Patent: Nov. 21, 1989

[54] PROTECTIVE GROUNDING AND REFERENCING ARRANGEMENT FOR HIGH VOLTAGE BULK SUPPLY

[75] Inventor: Luther L. Genuit, Scottsdale, Ariz.

[73] Assignee: Honeywell Bull Inc., Phoenix, Ariz.

[21] Appl. No.: 132,838

[22] Filed: Dec. 14, 1987

[51] Int. Cl.⁴ ............................................. H02H 9/04
[52] U.S. Cl. ....................................... 361/42; 361/48; 361/50; 363/35; 363/52
[58] Field of Search ........................ 361/42, 54, 56, 47, 361/49, 50, 48; 363/34, 35, 37, 50, 52, 53, 126, 125

[56] References Cited

U.S. PATENT DOCUMENTS

| | | | |
|---|---|---|---|
| 4,551,780 | 11/1985 | Canay | 361/544 |
| 4,573,098 | 2/1986 | Williston | 361/42 |
| 4,709,164 | 11/1987 | Giesl | 361/424 |

*Primary Examiner*—Derek S. Jennings
*Attorney, Agent, or Firm*—J. H. Phillips; J. S. Solakian

[57] ABSTRACT

A protective grounding and referencing arrangement for a high-voltage, high-energy bulk supply is provided in the present invention. Isolation from ground is provided through the use of an isolation transformer connected between the a-c utility supply and the rectifiers which are provided for conversion to d-c. The d-c bus and its energy storage capacitors are then referenced to ground by a high resistance divider network. In such an arrangement the likelihood of an insulation breakdown to ground is significantly reduced. More importantly, in the event that such a breakdown should occur from one or the other terminal of the d-c bus the fault currents that result are limited by the referencing arrangement to a safe level. The energy hazard is thus very significantly reduced for the equipment.

15 Claims, 4 Drawing Sheets

PROTECTIVE GROUNDING AND REFERENCING ARRANGEMENT FOR HIGH VOLTAGE BULK SUPPLY

BACKGROUND OF THE INVENTION

This invention relates to an electrical protection device, and more particularly, to a dedicated high-voltage, high-energy power source for electrical equipment such as the high-voltage d-c bulk supply in a large computer power system in which the bulk supply serves as a source for a number of d-c to d-c converters or switching regulators.

In a typical power system for a large computer the bulk supply may comprise a 300 VDC bus obtained by rectification of the three-phase 208 volt a-c utility supply voltage. To provide protection for the computer hardware against malfunctions due to voltage dips commonly occurring in the utility supply voltage, large electrolytic capacitors are usually connected across the terminals of the d-c bus. These capacitors may provide thousands of microfarads of storage as needed to carry the equipment operation through voltage dips with durations of 100 milliseconds or more. At 300 volts d-c very high and potentially dangerous energy levels are involved.

A primary consideration in the design of such a bulk supply is the safety of the supply. The utmost care must be taken to prevent harm to service and operating personnel and to prevent fire hazards in the event of insulation break-down or short circuits produced by hardware defects or human error.

The safe design of such equipment is complicated by several factors. First, is the nature of the energy hazard itself which has a capability of delivering hundreds of amperes of fault current through a short circuit. Fault currents of such magnitudes can produce arcing, showers of molten metal and fire. A second factor is the lack of adequate isolation of the bulk supply from equipment ground. In most equipment the d-c bulk voltage is obtained by direct rectification of the a-c line without the benefit of an isolation transformer. Because the a-c line is referenced to ground by direct connection, high energy fault currents are delivered to the short circuit by the low impedance line. In other equipment an isolation transformer is used but one of the d-c terminals is then connected directly to ground. If the other terminal is shorted to ground in such an arrangement the energy stored in the capacitor is discharged into the short circuit together with fault current delivered by the transformer. Because the 300 volt supply is typically distributed within the equipment cabinet to provide power to switching regulators at remote locations, the 300 volt distribution cables represent a significant hazard and they must be carefully protected against abrasion and various other forms of damage that might produce a short to ground.

In the present invention the d-c bulk supply is isolated by means of a transformer and is then referenced to ground through a high impedance in a manner that significantly reduces the energy hazard for the equipment during its initial test as well as during normal operation or field service activities.

SUMMARY OF THE INVENTION

Therefore, there is supplied by the present invention a protective grounding and referencing arrangement for high-voltage high-energy bulk supply. Isolation from the a-c source is provided through the use of an isolation transformer connected between the a-c utility supply and the rectifiers which are provided for conversion to d-c. The d-c bus and its energy storage capacitors are then referenced to ground by a high resistance divider network. In such an arrangement the likelihood of an insulation breakdown to ground is significantly reduced. More importantly, in the event that such a breakdown should occur from one or the other terminal of the d-c bus the fault currents that result are limited by the referencing arrangement to a safe level. The energy hazard is thus very significantly reduced for the equipment.

Accordingly, it is an object of the present invention to provide a grounding and referencing arrangement for a high-voltage and high-energy bulk supply for significantly reducing the voltage and energy hazards that are inherently present in such a supply.

It is another object of the present invention to provide isolation between the bulk supply and the a-c source so that a short to ground from the bulk supply will not produce high energy fault currents supplied by the low impedance a-c source which is normally referenced to ground by direct connection.

It is still a further object of the present invention to provide a balanced referencing means whereby the positive and negative terminals of the d-c bus are balanced about ground so that the potential between either terminal and ground is minimized.

It is yet another object of the present invention to provide such a balanced referencing means in the form of a high resistance network so that fault currents produced by a short to ground from either the positive or the negative terminal will be limited to a safe level.

It is still another object of the present invention to provide such protective grounding and referencing means for applications utilizing single-phase or multi-phase a-c sources and with either single or multiple d-c output lines.

These and other objects of the present invention will become more apparent when taken in conjunction with the following description and attached drawings, wherein like characters indicate like parts, and which drawings form a part of the present application.

DETAILED DESCRIPTION

There are a number of prior art approaches for bulk supplies used as direct current power sources for switch mode power supplies and other loads. Some of these prior art approaches will be discussed briefly in order to point out the advantages and improvements offered by the present invention. The lower power ratings are usually connected to a single-phase a-c utility power source; higher ratings may employ a three phase source. Some designs incorporate transformer isolation; others do not.

Figure 1:
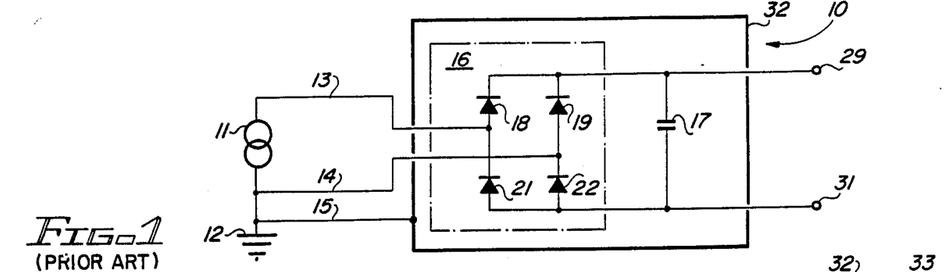
FIG. 1 shows a prior art circuit diagram for a single-phase, bulk supply not incorporating an isolation transformer.

Referring to FIG. 1, there is shown a prior art single-phase bulk supply 10 connected to a single-phase a-c source 11. One terminal of source 11 is connected to earth ground 12. The a-c voltage supplied by source 11 is distributed by a three-wire distribution system including a phase wire 13, a neutral wire 14, and a safety ground wire 15. The neutral and safety ground wires are connected to the grounded side of source 11; the phase wire 13 is connected to the ungrounded side of source 11. The phase wire 13 and the neutral wire 14 are load-carrying lines; the safety ground wire carries only leakage and fault currents.

Bulk supply 10 comprises a conventional single-phase bridge rectifier 16 and a storage capacitor 17 housed within a case or chassis 32, the case 32 being an electrically conducting material. Rectifier 16 includes four diodes, 18, 19, 21 and 22. Supply 10 has a positive output terminal 29 and a negative output terminal 31. The safety ground wire 15 is connected to the chassis 32 of bulk supply 10. In operation, during the positive half cycle of source 11, current flows through phase wire 13, through diode 18, through capacitor 17 and any connected loads, through diode 22 and neutral wire 14 to the grounded side of source 11. During the negative half cycle of source 11 current flows from the grounded side of source 11, through neutral wire 14, diode 19, capacitor 17 and the connected load, through diode 21 and phase wire 13 to the ungrounded side of source 11. It is to be noted that supply 10 has neither output terminal connected to chassis 32 or to earth ground 12.

Figure 2:
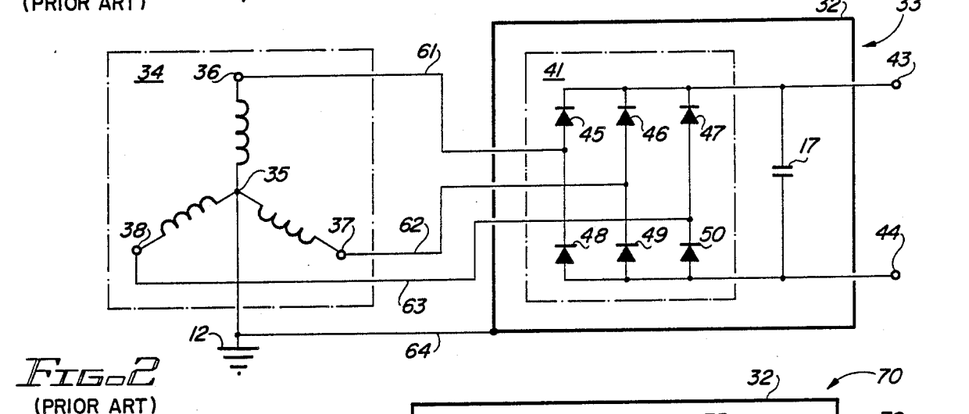
FIG. 2 shows a prior art circuit diagram for a three-phase bulk supply not incorporating an isolation transformer.

Referring to FIG. 2, there is shown a prior art three-phase bulk supply 33 connected to an a-c three-phase utility power source 34. Source 34 is shown as a wye-connected source with a neutral terminal 35 and three-phase terminals, 36, 37 and 38. Neutral terminal 35 is connected to earth ground 12.

Three phase bulk supply 33 comprises a three-phase full-wave bridge rectifier 41, a storage capacitor 17, having positive output terminal 43, and a negative output terminal 44 housed within a case 32. Bridge rectifier 41 comprises six diodes, 45–50.

Bulk supply 33 is connected to source 34 by means of an a-c distribution line comprising three-phase wires 61, 62 and 63 and a safety ground wire 64. The chassis 32 is connected to earth ground 12 by safety ground wire 64. Bulk supply 33 operates in the conventional manner well understood by those skilled in the art with currents supplied from source 34 through diodes 45–50 when any of the phase-to-phase voltages exceeds the instantaneous voltage of capacitor 42. Again, neither the positive output terminal 43 nor the negative output terminal 44 is connected to chassis 32 or to earth ground 12.

Figure 3:
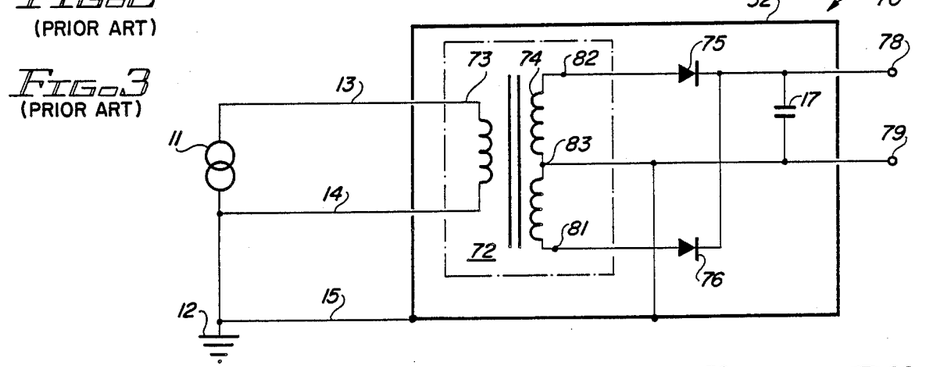
FIG. 3 shows a prior art circuit diagram for a single-phase bulk supply incorporating an isolation transformer with one terminal of the d-c output connected directly to ground.

Referring to FIG. 3, there is shown a prior art single-phase bulk supply 70 incorporating transformer isolation and connected to a single-phase a-c utility power source 11. Bulk supply 70 comprises an isolation transformer 72 with a primary winding 73 and a center-tapped secondary winding 74, two diodes, 75 and 76, a storage capacitor 17, housed within a case 32, and further includes a positive output terminal 78 and a negative output terminal 79. Primary winding 73 is connected between phase wire 13 and neutral wire 14. Secondary winding 74 has a start terminal 81, a finish terminal 82 and a center tap 83. Chassis 32 is connected to earth ground 12 by safety ground wire 15. Bulk supply 70 operates in the conventional manner well understood by those skilled in the art with the lower half of winding 74 supplying current through diode 76 to capacitor 77 and any connected load during one half cycle and with the upper half of winding 74 supplying current through diode 75 during the next half cycle. As noted earlier the negative output terminal 79 is connected to the chassis 32 and to earth ground 12.

Figure 4:
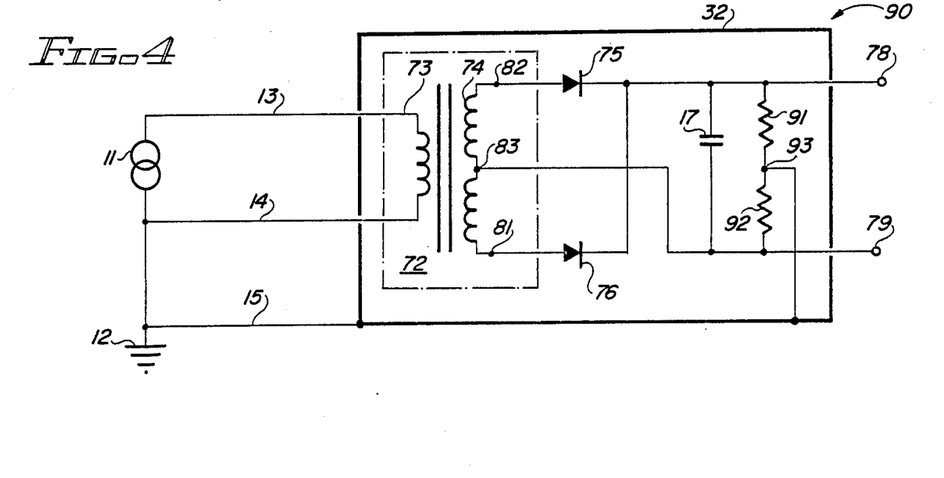
FIG. 4 is a circuit diagram for a single-phase bulk supply incorporating the protective grounding and referencing arrangement of the present invention.

Referring to FIG. 4, there is shown a circuit diagram of the protective grounding and referencing arrangement of the present invention as incorporated in a single-phase transformer-isolated bulk supply 90. Supply 90 of the present invention differs from supply 70 of the prior art in one important aspect. Whereas the centertap of transformer 72 and the negative output terminal 79 of supply 70 were connected directly to chassis 32 and to earth ground 12, the ground connections are accomplished in the bulk supply 90 of the present invention through the use of a resistance divider network comprising two resistors 91 and 92. Resistors 91 and 92 are serially connected between the positive output terminal 78 and negative output terminal 79, respectively, of bulk supply 90. The direct ground connection from center tap 83 to chassis 32 of supply 70 is omitted in the supply 90 of the present invention. The junction point 93 between serially connected resistors 91 and 92 is connected instead to chassis 32. Resistors 91 and 92 are preferably equal in value so that the positive voltage at terminal 78 and the negative voltage at terminal 79 are balanced about ground. Thus if the output voltage appearing across output terminals 78, 79 is designated as Vo, terminal 78 will be Vo/2 volts positive with respect to chassis 32 and earth ground 12 while terminal 79 will be Vo/2 volts negative with respect to the grounded chassis. The maximum voltage present between either output terminal 78, 79 and the chassis 32 is thus only half the voltage present at the positive output terminal 78 of the prior art supply 70 relative to the chassis 32. The ohmic values of resistors 91 and 92 are also preferably high so that fault currents will be limited to safe levels. Since the output voltage of the bulk supplies discussed here are relatively high voltage d-c, further explanation of this effect will be given later.

Figure 5:
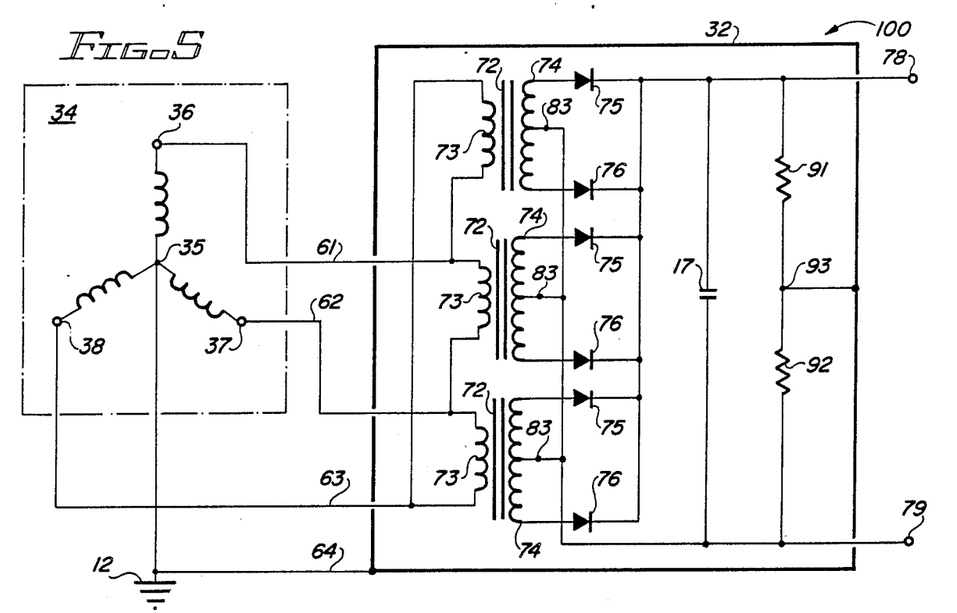
FIG. 5 is a circuit diagram for a three-phase, single-output bulk supply incorporating the protective grounding and referencing arrangement of the present invention.

Referring to FIG. 5, there is shown a circuit diagram in which the resistive divider network described above is incorporated in a three-phase extension of the bulk supply of FIG. 4 (the bulk supply is used to denote the circuitry contained within chassis 32). FIG. 5 shows a transformer isolated bulk supply 100 connected to a three-phase source 34 that is identical to the three-phase source 34 described above in conjunction with FIG. 2, having its neutral terminal 35 connected to earth ground 39 and its phase voltages distributed by phase wires 61–63.

Bulk supply 100 comprises three isolation transformers 72, having a primary winding 73 and a center-tapped secondary winding 74, and each having its secondary windings connected in the same manner to two diodes 75 and 76. One of the three transformers 72 of supply 100 has its primary winding 73 connected between lines 61 and 62 of source 34, another has its primary winding connected between lines 62 and 63, and the other between lines 63 and 61. This is known as a delta connection; the wye connection can also be employed with each primary connected between one of the phase wires and the neutral terminal 35. As in the case of the single-phase supply 90, the cathodes of the six diodes 75, 76 are connected to a positive terminal of a storage capacitor 17 and to a positive output terminal 78. The centertaps 83 of each of the isolation transformers 72 are connected to a negative terminal of storage capacitor 17 and to a negative output terminal 79. The protective grounding and referencing arrangement of the present invention in this implementation includes serially-connected resistors 91, 92 connected between positive and negative output terminals 78, 79, respectively, and the junction point 93 between resistors 91, 92 is connected to the chassis 32 which in turn is connected to earth ground 12 by safety ground wire 64. Again, in the three-phase implementation of the present invention the d-c output voltage appearing at output terminals 78, 79 is balanced about chassis 32 and earth ground 12 such that if the total output voltage is $V_o$ volts, terminal 78 is $V_o/2$ volts positive and terminal 79 is $V_o/2$ volts negative with respect to ground.

Figure 6:
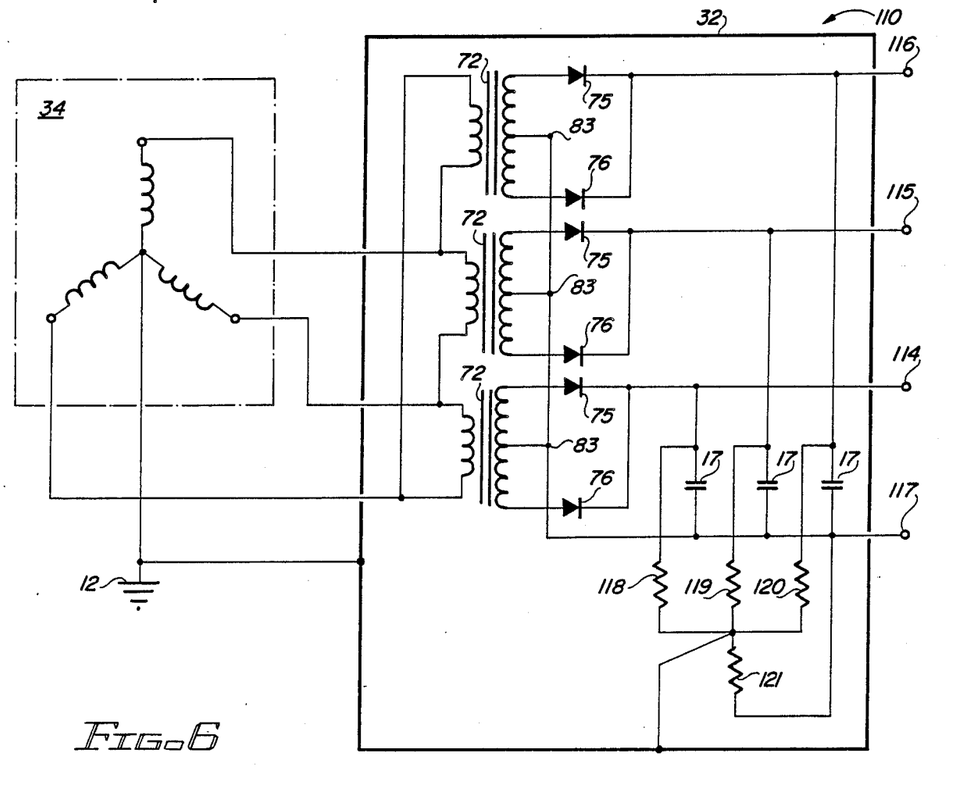
FIG. 6 is a circuit diagram for a three-phase, three-output bulk supply incorporating an alternative protective grounding and referencing arrangement of the present invention.

Referring to FIG. 6, there is shown an alternative embodiment of the three-phase bulk supply of FIG. 5 and a corresponding alternative embodiment of the protective grounding and referencing arrangement. In the bulk supply 110 of FIG. 6 provision is made for loading each of the three transformers 72 separately. The three transformers 72 of supply 110 are identical to the three transformers 72 of supply 100 of FIG. 5, and they are connected in the same manner to three-phase source 34, each being further connected in the same way to a pair of diodes 75 and 76. However, the bulk supply 110 has the common cathodes of each corresponding pair of diodes 75, 76 connected to a corresponding storage capacitor 17. The negative terminals of each of the three capacitors 17 are connected together and their common connection is wired to a common connection of the centertaps 83 of the three transformers 72, which also forms the common negative output terminal 117. The positive terminals of the three capacitors 17 are connected, respectively to three positive output terminals, 114, 115 and 116.

The preferred embodiment of the protective grounding and referencing arrangement of the present invention for bulk supply 110 comprises four resistors 118, 119, 120 and 121. The resistance values of resistors 118, 119 and 120 are equal to each other and each is three times the resistance value of resistor 121. Resistor 121 is connected between the common negative output terminal and chassis 32. Assuming all three output voltages developed across the three capacitors are the same and equal to Vo volts, the three positive output voltages at terminals 114, 115 and 116 will be equal to $+V_o/2$ volts and the voltage at the common negative output terminal 117 will be $-V_o/2$ volts.

The advantages offered by the protective grounding and referencing arrangement of the invention in terms of enhanced product safety is best understood through a comparison of the effects produced by a short to ground in the prior art circuits with the effects produced by the same short to ground in a similar circuit incorporating the protective network.

Figure 7:
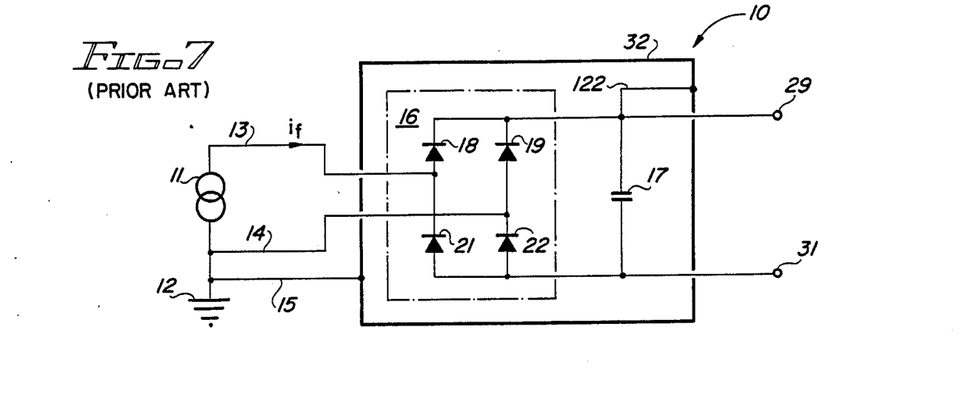
FIG. 7 is an equivalent circuit illustrating the effect of a short circuit occurring between the positive output terminal and ground for the prior art circuit of FIG. 1.

Referring to FIG. 7, there is illustrated the effects of a short circuit occurring between the positive output terminal and the chassis for the prior art bulk supply 10 of FIG. 1. If a short circuit 122 occurs between positive output terminal 29 and the chassis 32 a fault current $i_f$ flows from the "hot" or ungrounded side of source 11 through phase wire 13, through diode 18, through the short circuit 122 to frame 32 and through safety ground wire 15 to the grounded side of source 11. The full source voltage drives the fault current and the magnitude of the fault current is limited only by the very low diode resistance, the wiring and the short circuit itself. Even if the bulk supply 10 is protected by a circuit breaker at its input connection to source 11, the circuit breaker will probably be too slow to prevent failure of diode 18 or to prevent severe arcing at the location of the short circuit.

Figure 8:
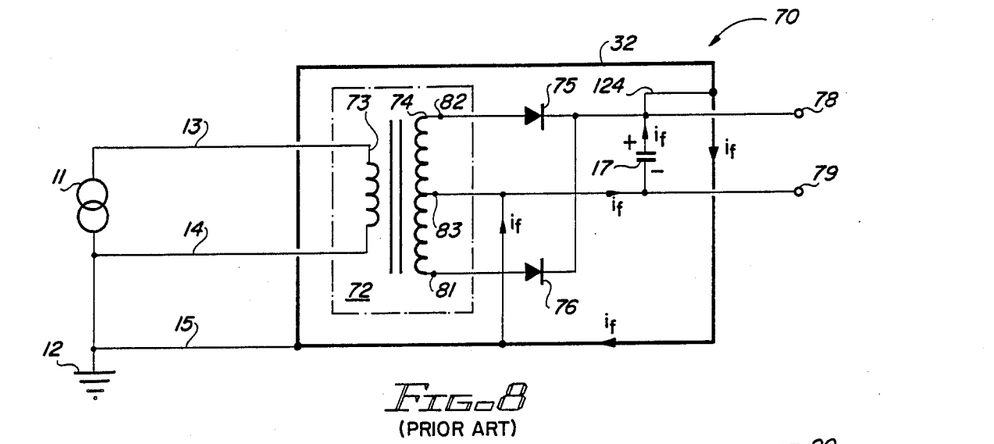
FIG. 8 is an equivalent circuit illustrating the effect of a short circuit occurring between the positive output terminal and ground for the prior art circuit of FIG. 3.

Referring to FIG. 8, there is illustrated the effects of a short circuit occurring between the positive output terminal and the chassis for the prior art transformer isolated bulk supply 70 of FIG. 3. If a short circuit 124 occurs between positive output terminal 78 and chassis 32 a fault current $i_f$ flows from the positive terminal of capacitor 17 to terminal 78 (electrically. terminal 78 is tied to chassis 32), through short circuit 124 to chassis 32, through the ground connection to centertap 83 of transformer 72 and to the negative terminal of capacitor 17. Except for the negligible equivalent series resistance (ESR) of capacitor 17, the fault current if is limited only by wiring resistance so that virtually all of the energy stored in capacitor 17 is delivered to the short circuit. Extremely dangerous arcing can result. Furthermore, the short circuit constitutes, in this case, a short across the secondary of transformer 72 so that the full short circuit current capability of transformer 72 is also delivered to the short circuit.

Figure 9:
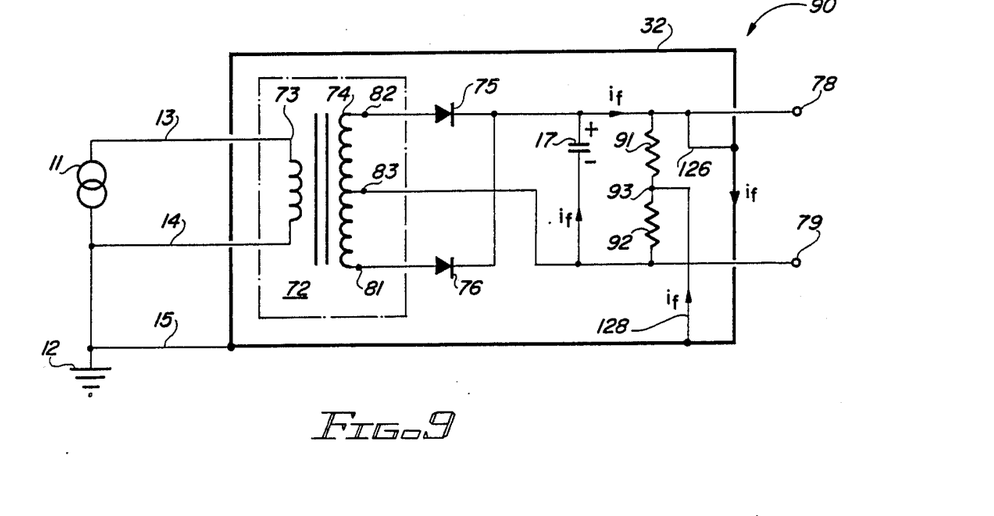
FIG. 9 is an equivalent circuit illustrating the effect of a short circuit occurring between the positive output terminal and ground for the single-phase implementation of the present invention as shown in FIG. 4.

The effects of the same short circuit occurrences in bulk supplies incorporating the protective grounding and referencing arrangement of the present invention will now be explained. Referring to FIG. 9, there is illustrated the effects of a short circuit 126 occurring between the positive output terminal 78 and chassis 84 of bulk supply 90 (of FIG. 4) which incorporates the protective arrangement of the present invention. With terminal 78 shorted to chassis 32, a fault current $i_f$ flows from the positive terminal of capacitor 17 to terminal 78, through short circuit 126 to chassis 32 through the ground connection 128 to junction point 93 and through divider resistor 92 to the negative terminal of capacitor 17. Fault current $i_f$ is limited in this case by resistor 92. Thus, if the voltage across capacitor 17 is 300 volts d-c and resistor 92 has a value of 100,000 ohms, the fault current is only three milliamperes, i.e., non-hazardous.

Figure 10:
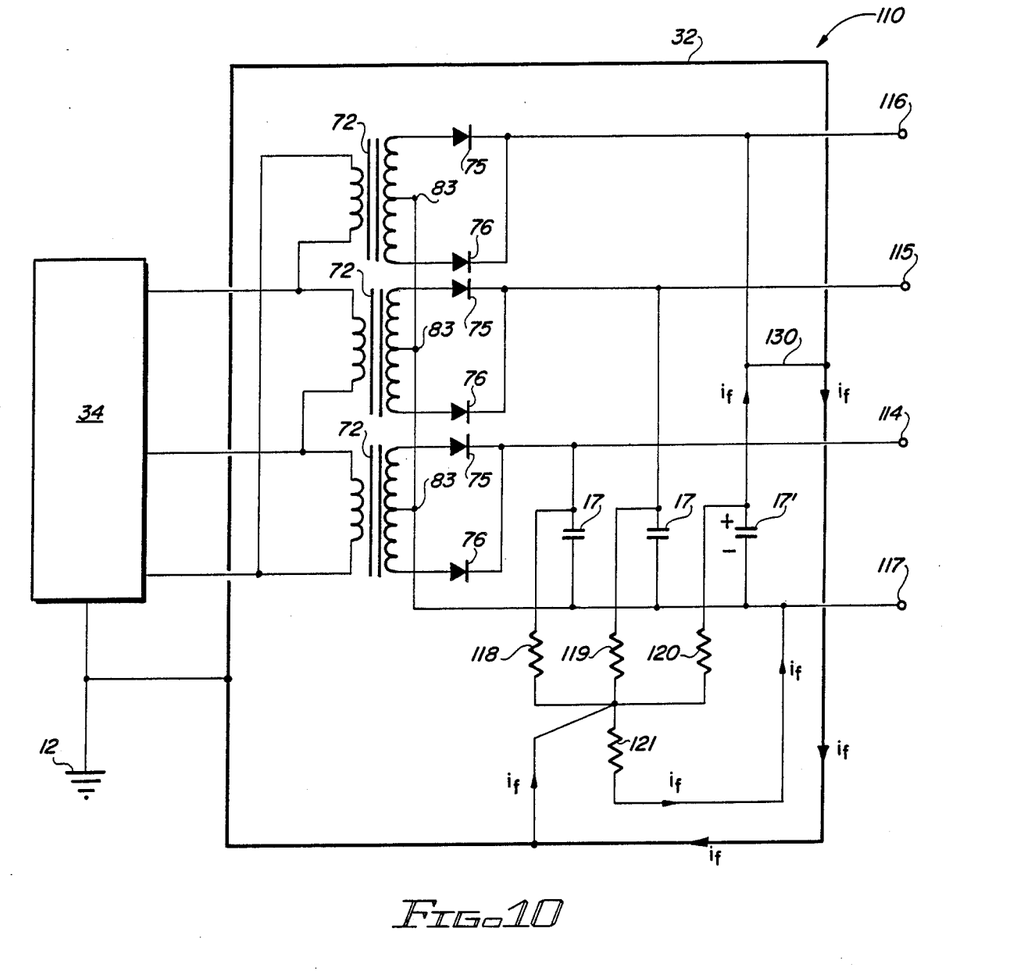
FIG. 10 is an equivalent circuit illustrating the effect of a short circuit occurring between one of the three positive output terminals and ground for the three-phase implementation of the invention as shown in FIG. 6.

Referring to FIG. 10, there is shown the effects of a short circuit 130 occurring between positive output terminal 116 and chassis of three-phase bulk supply 110 (of FIG. 6 which incorporates separate loading of the three transformers 72 and the more elaborate referencing network comprising resistors 118-121 as described above. With the occurrence of a short circuit 130, a fault current $i_f$ flows from the positive terminal of capacitor 17' to terminal 116, through short circuit 130 to chassis 32 and through resistor 121 to the negative terminal of capacitor 17'. Fault current $i_f$ is driven by the voltage present across capacitor 17' and is limited by resistor 121. Again, if the capacitor voltage is 300 volts and resistor 121 is 100,000 ohms the fault current is only three milliamperes. Smaller values of resistance such as 10,000 ohms is also effective in preventing hazardous arcing.

An added advantage of the protective grounding and referencing arrangement of the present invention is that the fault currents do not flow in the safety ground wire because of the incorporation of the isolation transformer(s). Although not fully discussed herein, those skilled in the art will understand (based on the foregoing discussion) that fault currents resulting from short circuits to chassis from other live parts in any of the bulk supplies 90, 100 or 110 will also be limited to the same safe levels because the return path is always through one of the referencing network resistors 91, 92, 118, 119, 120 or 121.

While there have been shown what are considered the preferred embodiments of the present invention, it will be manifest that many changes and modifications can be made therein without departing from the essential spirit and scope of the invention. It will be readily apparent, for example, that other rectifier circuits, such as half-wave rectifiers and full-wave bridge rectifier circuits may be employed in the practice of the invention. It is intended, therefore, in the annexed claims to cover all such changes and modifications which fall within the true scope of the invention.

I claim:

1. A bulk supply for converting electrical energy from an a-c source to high voltage d-c, said bulk supply comprising:
   (A) a grounded, electrically conductive chassis;
   (B) an isolation transformer having a primary winding and a secondary winding, said secondary winding having a centertap;
   (C) means coupling the a-c source to said primary winding;
   (D) first and second output terminals;
   (E) means coupling said centertap to said second output terminal;
   (F) rectifier means coupled to said secondary winding and to said first output terminal for converting a-c voltage appearing across said secondary winding to d-c voltage appearing at said first output terminal with respect to said second output terminal;
   (G) a resistive divider network connected between said first and second output terminals, said resistive divider network including first and second resistors joined at a junction; and
   (H) means electrically connecting said junction to said chassis;

whereby said resistive divider network causes the d-c voltage appearing across said output terminals to be floating with respect to said chassis, thereby limiting fault currents which result from short circuits between said output terminals and ground potential to non-hazardous levels.

2. The bulk supply of claim 1 which further includes a storage capacitor connected across said first and second output terminals.

3. The bulk supply of claim 1 in which said first and second resistors have the same resistance values such that the d-c potentials appearing at said output terminals are balanced with respect to said chassis.

4. The bulk supply of claim 2 in which said first and second resistors have the same resistance values such that the d-c potentials appearing at said output terminals are balanced with respect to said chassis.

5. A bulk supply for converting electrical energy from a three-phase a-c source to high voltage d-c, said bulk supply comprising:
   (A) a grounded, electrically conductive chassis;
   (B) first, second and third isolation transformers each having a primary winding and a secondary winding, said secondary windings having respective first, second and third centertaps;
   (C) means coupling each phase from the three phase a-c source to a unique one of said primary windings;
   (D) first and second output terminals;
   (E) means coupling said first, second and third centertaps to said second output terminal;
   (F) first, second and third rectifier means respectively coupled to said first, second and third secondary windings and to said first output terminal for converting a-c voltage appearing across each of said secondary windings to d-c voltage appearing at said first output terminal with respect to said second output terminal;
   (G) a resistive divider network connected between said first and second output terminals, said resistive divider network including first and second resistors joined at a junction; and
   (H) means electrically connecting said junction to said chassis;

whereby said resistive divider network causes the d-c voltage appearing across said output terminals to be floating with respect to said chassis, thereby limiting fault currents which result from short circuits between said output terminals and ground potential to non-hazardous levels.

6. The bulk supply of claim 5 which further includes a storage capacitor connected across said first and second output terminals.

7. The bulk supply of claim 5 in which said first and second resistors have the same resistance values such that the d-c potentials appearing at said output terminals are balanced with respect to said chassis.

8. The bulk supply of claim 6 in which said first and second resistors have the same resistance values such that the d-c potentials appearing at said output terminals are balanced with respect to said chassis.

9. A bulk supply for converting electrical energy from a three-phase a-c source to high voltage d-c available at a plurality of d-c output terminals, said bulk supply comprising:
   (A) a grounded, electrically conductive chassis;
   (B) first, second and third isolation transformers each having a primary winding and a secondary winding, said secondary windings having respective first, second and third centertaps;

(C) means coupling each phase from the three phase a-c source to a unique one of said primary windings;
(D) first, second third and fourth output terminals, said fourth output terminal being a common output terminal;
(E) means coupling said first, second and third centertaps to said common output terminal;
(F) first, second and third rectifier means;
  (1) said first rectifier means being electrically positioned intermediate said first secondary winding and said first and fourth output terminals, said first rectifier means being configured and connected to convert a-c voltage appearing across said first secondary winding to d-c voltage appearing at said first output terminal with respect to said fourth output terminal;
  (2) said second rectifier means being electrically positioned intermediate said second secondary winding and said second and fourth output terminals, said first rectifier means being configured and connected to convert a-c voltage appearing across said second secondary winding to d-c voltage appearing at said second output terminal with respect to fourth output terminal; and
  (3) said third rectifier means being electrically positioned intermediate said third secondary winding and said third and fourth output terminals, said first rectifier means being configured and connected to convert a-c voltage appearing across said third secondary winding to d-c voltage appearing at said third output terminal with respect to said fourth output terminal;
(G) a resistive divider network connected among said output terminals, said resistive divider network including a plurality of resistors having a first electrical end connected, respectively, to a unique one of said output terminals, including said output terminal, and having a second end connected to a common junction; and
(H) means electrically connecting said junction to said chassis;
whereby said resistive divider network causes the d-c voltages appearing across said output terminals to be floating with respect to said chassis, thereby limiting fault currents which result from short circuits between said output terminals and ground potential to non-hazardous levels.

10. The bulk supply of claim 9 which further includes a plurality of storage capacitors, each of said storage capacitors being connected between said common output terminal and a unique other one of said output terminals.

11. The bulk supply of claim 9 in which said resistor connected between said junction and said common output terminal has a first resistive value and said resistors connected between said junction and all others of said output terminals have resistive values which are greater than said first resistive value.

12. The bulk supply of claim 10 in which said resistor connected between said junction and said common output terminal has a first resistive value and said resistors connected between said junction and all others of said output terminals have resistive values which are greater than said first resistive value.

13. A bulk supply for converting electrical energy from an a-c source to high voltage d-c, said bulk supply comprising:

(A) a grounded, electrically conductive chassis;
(B) an isolation transformer having a primary winding and a secondary winding;
(C) means coupling the a-c source to said primary winding;
(D) first and second output terminals;
(E) rectifier means electrically positioned intermediate said secondary winding and said first and second output terminals, said rectifier means being configured and connected to convert a-c voltage appearing across said secondary winding to d-c voltage appearing across said first and second output terminals;
(F) a resistive divider network connected between said first and second output terminals, said resistive divider network including first and second resistors joined at a junction; and
(G) means electrically connecting said junction to said chassis;
whereby said resistive divider network causes the d-c voltage appearing across said output terminals to be floating with respect to said chassis, thereby limiting fault currents which result from short circuits between said output terminals and ground potential ton on-hazardous levels.

14. A bulk supply for converting electrical energy from a three-phase a-c source to high voltage d-c, said bulk supply comprising:

(A) a grounded, electrically conductive chassis;
(B) first, second and third isolation transformers each having a primary winding and a secondary winding;
(C) means coupling each phase from the three phase a-c source to a unique one of said primary windings;
(D) first and second output terminals;
(E) first, second and third rectifier means respectively electrically positioned intermediate said first, second and third secondary windings and to said first and second output terminals, each said rectifier means being configured and connected to convert a-c voltage appearing across each of said secondary windings to d-c voltage appearing across said first and second output terminals;
(F) a resistive divider network connected between said first and second output terminals, said resistive divider network including first and second resistors joined at a junction; and
(G) means electrically connecting said junction to said chassis;
whereby said resistive divider network causes the d-c voltage appearing across said output terminals to be floating with respect to said chassis, thereby limiting fault currents which result from short circuits between said output terminals and ground potential to non-hazardous levels.

15. A bulk supply for converting electrical energy from a three-phase a-c source to high voltage d-c available at a plurality of d-c output terminals, said bulk supply comprising:

(A) a grounded, electrically conductive chassis;
(B) first, second and third isolation transformers each having a primary winding and a secondary winding;
(C) means coupling each phase from the three phase a-c source to a unique one of said primary windings;

(D) first, second, third and fourth output terminals, said fourth output terminal being a common output terminal;

(E) first, second and third rectifier means;

(1) said first rectifier means being electrically positioned intermediate said first secondary winding and said first and fourth output terminals, said first rectifier means being configured and connected to convert a-c voltage appearing across said first secondary winding to d-c voltage appearing across said first and fourth output terminals;

(2) said second rectifier means being electrically positioned intermediate said second secondary winding and said second and fourth output terminals, said first rectifier means being configured and connected to convert a-c voltage appearing across said second secondary winding to d-c voltage appearing across said second and fourth output terminals; and (3) said third rectifier means being electrically positioned intermediate said third secondary winding and said third and fourth output terminals, said first rectifier means being configured and connected to convert a-c voltage appearing across said third secondary winding to d-c voltage appearing across said third and fourth output terminals;

(F) a resistive divider network connected among said output terminals, said resistive divider network including a plurality of resistors having a first electrical end connected, respectively, to a unique one of said output terminals, including said output terminal, and having a second end connected to a common junction; and (G) means electrically connecting said junction to said chassis;

whereby said resistive divider network causes the d-c voltages appearing across said output terminals to be floating with respect to said chassis, thereby limiting fault currents which result from short circuits between said output terminals and ground potential to non-hazardous levels.

* * * * *